US011693991B2

(12) United States Patent
Bacca et al.

(10) Patent No.: US 11,693,991 B2
(45) Date of Patent: Jul. 4, 2023

(54) CHECKING THE INTEGRITY OF AN ELECTRONIC DEVICE

(71) Applicant: LEDGER, SAS, Paris (FR)

(72) Inventors: Nicolas Bacca, Courbevoie (FR); Olivier Tomaz, Orsay (FR)

(73) Assignee: Ledger, SAS, Paris (FR)

(*) Notice: Subject to any disclaimer, the term of this patent is extended or adjusted under 35 U.S.C. 154(b) by 241 days.

(21) Appl. No.: 16/958,113

(22) PCT Filed: Dec. 21, 2018

(86) PCT No.: PCT/FR2018/000270
§ 371 (c)(1),
(2) Date: Jun. 25, 2020

(87) PCT Pub. No.: WO2019/129937
PCT Pub. Date: Jul. 4, 2019

(65) Prior Publication Data
US 2020/0342141 A1 Oct. 29, 2020

(30) Foreign Application Priority Data

Dec. 26, 2017 (FR) ...................... 1771431

(51) Int. Cl.
G06F 21/64 (2013.01)
G06F 21/57 (2013.01)
(Continued)

(52) U.S. Cl.
CPC .............. *G06F 21/64* (2013.01); *G06F 21/57* (2013.01); *G06F 21/602* (2013.01); *G06F 21/78* (2013.01)

(58) Field of Classification Search
CPC ........ G06F 21/64; G06F 21/57; G06F 21/602; G06F 21/78
See application file for complete search history.

(56) References Cited

U.S. PATENT DOCUMENTS 5,721,781 A 2/1998 Deo et al.
6,830,840 B1 12/2004 Hatoh et al.
(Continued)

OTHER PUBLICATIONS

International Search Report dated Feb. 11, 2019, issued in PCT/FR2018/000270, filed Dec. 21, 2018.
(Continued)

Primary Examiner — Ayoub Alata
(74) Attorney, Agent, or Firm — Workman Nydegger

(57) ABSTRACT

The method for checking the integrity of an electronic device (DE), in particular a payment terminal, including at least one processor (MPU), a secure element (SE) able to store and manage data and into which a public key that is intended to verify an electronic signature has been loaded, and a data storage means (MEM), whose content has been authenticated beforehand and whose integrity is able to be verified by the public key, is such that a command to check integrity brings about the execution of the following successive steps: the processor (MPU) of the device calls upon the secure element (SE); in response, the secure element (SE) addresses, to the data storage means (MEM), a request for the purpose of receiving the integral content of its memory; the secure element then executes, on the content received from the memory of the data storage means (MEM), an authenticity verification in order to verify, using the public key (KP), that its content has not been able to be modified since its initial authentication; when the authenticity verification succeeds, the device is considered to be integral.

13 Claims, 2 Drawing Sheets

(51) Int. Cl.
*G06F 21/60* (2013.01)
*G06F 21/78* (2013.01)

(56) References Cited

U.S. PATENT DOCUMENTS

| 9,177,152 B2 | 11/2015 | Laclercq |
| 2002/0023032 A1 | 2/2002 | Pearson et al. |
| 2014/0278882 A1* | 9/2014 | Yu .................. G06Q 30/0226 |
| | | 705/14.26 |

OTHER PUBLICATIONS

Written Opinion dated Feb. 11, 2019, issued in PCT/FR2018/000270, filed Dec. 21, 2018.

* cited by examiner ic device, such an electronic device being capable of implementing this process, and the uses of such an electronic device implementing this process. Hereinafter, the electronic device will sometimes simply be referred to as the "device".

CHECKING THE INTEGRITY OF AN ELECTRONIC DEVICE

BACKGROUND OF THE INVENTION

1. The Field of the Invention

The invention relates to the field of integrity checks on electronic devices.

The invention more specifically relates to a process for checking the integrity of an electronic device, such an electronic device being capable of implementing this process, and the uses of such an electronic device implementing this process. Hereinafter, the electronic device will sometimes simply be referred to as the "device".

2. The Relevant Technology

A device such as the one used in the invention may be a card payment system, this example and this application not being exclusive of others. "Card payment system" means the functional combination of a payment terminal and a bank payment chip card.

In a manner known per se, a device of the type of that used in the invention comprises at least:
 a processor (commonly called an MPU for "micro-processor unit"),
 a secure element (which may be, in particular, a smart card) capable of storing and managing data, and onto which a public key intended for verifying an electronic signature has been loaded, and
 a means of data storage (such as memory).

Furthermore, it is also known that the content of a storage means can be authenticated beforehand such that its integrity can be verified by a public key corresponding to the private key used for said authentication. In the context of this invention, this public key can be the one loaded in the memory of the secure element.

In the context of the invention, "integrity check" refers to a verification that the data have not been modified or destroyed in an unauthorised manner, in accordance with the definition given by ISO standard No. 7498-2.

In a manner known per se, during a stage prior to provision to the user, a stage which may be the manufacture of the device in question or its configuration by a supplier of products or services, its constituent elements can be authenticated by an ad hoc, government or private certification authority.

During a subsequent deployed stage, it is important that the device can always be implemented by the user with confidence, i.e., with guarantees as to the preservation of its integrity. Such is the purpose of the invention.

Electronic signatures used to guarantee the integrity of an electronic document or information and to authenticate the author are already known. However, the electronic signature mechanism alone does not guarantee that a program that has provided a signature does exactly what it claims to do.

Credit card payment systems conduct authentication by bank card/authentication server and payment terminal/authentication server challenge-response mechanisms, as well as validation that the payment terminal does indeed have the private key that it is required to have for the card being used. However, the user cannot know, and therefore has no certainty as to the correlation between the transaction which he carries out by means of the payment terminal and the transaction actually carried out by the payment terminal.

Certifications provided by the EMVCo® group and similar organisations do not prevent counterfeit or cloned payment terminals from being used.

The state of the art is also illustrated by documents U.S. Pat. Nos. 6,830,840 and 5,721,781.

Document U.S. Pat. No. 6,830,840 describes a method which enables a memory card and a terminal to authenticate themselves and in which all algorithmic calculations are carried out by the terminal to which the memory card is connected. The operations associated with authentication are carried out before the start of a transaction proper, and after the end of the transaction with a view to authentication at the start of the next transaction.

Document U.S. Pat. No. 5,721,781 describes a method for authenticating a transaction between a portable information device and a terminal, the portable information device storing a certificate linked to a device unique to the device and the terminal storing a certificate linked to the terminal which is unique to the terminal which includes information concerning a type of terminal. The method comprises the following steps: exchange the certificates linked to the terminal and linked to the terminal between the portable information device and the terminal during a transaction; authenticate the portable information device and the terminal with each other using the certificates linked to the exchanged device and the terminal; determine, on the portable information system, a security level for the terminal based on the terminal-type information contained in the certificate linked to the terminal received from the terminal, the security level having an associated limit value for a value of the transaction carried out during the transaction; and restrict the value of the transaction to the value limit associated with the determined security level.

Document US 2002/023032 relates to a method for enabling a financial transaction to be performed using an electronic system, consisting in interrogating an electronic transaction terminal with an electronic security device in order to obtain an integrity metric for the financial transaction terminal; determining if the transaction terminal is a trusted terminal based on the integrity metric; allowing financial transaction data to be entered into the transaction terminal if the transaction terminal has been identified as a trusted terminal. Document US 2002/023032 also relates to a financial transaction system comprising an electronic financial terminal; an electronic security device having interrogation means for interrogating the electronic financial transaction terminal to obtain an integrity metric for the electronic financial transaction terminal, determining means for determining whether the transaction terminal is a terminal based on the integrity metric, means for authorising financial transaction data to enter into the transaction terminal if the transaction terminal is identified as a trusted terminal. The method and the system described in document US 2002/023032 do not prevent the entire memory of the transaction terminal from being subjected to hashing by the secure element. However, only subjecting one certificate and one checksum to hashing implies that they may have been falsified. The method and system described in document US 2002/023032 do not allow the level of functionality of the secure element to be adjusted as a function of the integrity metric.

Document U.S. Pat. No. 9,177,152 relates to a method for the authentication and decryption of an encrypted program file intended to be executed by a secure element, which consists in receiving the program file and a digital certificate associated with the program file from an external device. The method stores the program file and the associated certificate in secure RAM located in the secure element and hashes the program file to obtain a hash. The method authenticates the program file by comparing the hash obtained to a checksum stored in the certificate. Furthermore, the method writes the execution configuration information stored in the certificate to the corresponding configuration registers in the secure element; the process also generates an encryption key using a seed value stored in the certificate and a unique identifier located in the secure element, and decrypts the program file using the generated encryption key. The method according to document U.S. Pat. No. 9,177,152 does not allow the secure element to hash a program which cannot be stored in its secure random access memory. Furthermore, this document does not cover authorisation of the execution of the program by another microprocessor.

The methods and systems described in documents US 2002/023032 and U.S. Pat. No. 9,177,152 are such a checksum or the full but relatively small content are submitted to the secure element, the integrity of which it verifies.

SUMMARY OF THE INVENTION

Quite to the contrary, in the spirit of the invention, the desire is that it is the secure element which decides which functionalities it can cover depending on the result of the integrity check performed on the rest of the platform, which implies that it must control the entire memory of the rest of the microprocessors.

Such a desire faces two obstacles. On the one hand, securely checking the integrity of a large amount of information is hampered by the fact that the content must be sent and hashed by the secure element, which creates a performance bottleneck for the integrity check operation. On the other hand, the fact that the other microprocessor is still in operation during transmission of the entire content of its memory makes it necessary to ensure that it has not modified the data transmitted on the fly in order to mask possible modifications made by a malicious third party wishing to compromise the system.

These two obstacles explain why currently existing solutions do not proceed in this direction, but rather verify the content either before their execution, or via a simple integrity checksum and an associated certificate.

However, the solutions to these two obstacles, as presented by the invention, enable advanced functionalities to be added to the system. For example, the fact that, depending on the level of integrity observed, the secure element is not reduced to the binary choice of either delivering or not delivering the service, but uses a gradient of functionalities.

As such, the general problem exists of allowing users to control the integrity of a transaction validation device, namely the integrity of a smart card/payment terminal pair (taking into account the heterogeneity of these devices) and the particular problem of overcoming the two obstacles stated above.

The invention aims to provide a solution to these problems through the secure element. As such, in the subsequent deployed phase of the device, it can always be implemented by the user with confidence.

To this end, it is implemented in the subsequent deployed phase, the public key/private key pair having been used in the prior phase (manufacturing or configuration). The two phases are therefore interdependent.

Below is a description of the invention.

According to a first aspect, the purpose of the invention is to provide a method for checking the integrity of an electronic device, in particular a card payment system, comprising at least:

A processor, a secure element capable of storing and managing data, and onto which a public key intended for verifying an electronic signature has been loaded, and a means of storing data, the content of which has been previously authenticated and the integrity of which can be verified using the public key.

such that an integrity control command results in the execution of the following steps:

the secure element performs, through the processor and on the content received from the memory of the data storage means, an authentication check in order to verify, by means of the public key, that its content has not been modified since the initial authentication procedure, when the authentication check is successful, the device is considered to be integral.

The method is such that an integrity control command involves the execution of the following successive steps:

the processor of the device calls the secure element, in response, the secure element sends, via the processor, by means of data storage, a request to receive the entire content of its memory, the secure element then performs said authentication check.

According to one embodiment, when the device is considered to be integral, said device is able to operate according to the nominal behaviour standards attributed to it, According to one embodiment, when the authentication check is unsuccessful, the device is programmed to operate in an appropriate mode, taking into account the failure of the verification procedure.

According to one embodiment, the method comprises, in addition to the steps executed each time that an integrity control command is sent to the device, a preliminary phase during which the electronic device is configured, whereby the initial content of the memory of the data storage means is validated using a digital authentication means such as, in particular, an electronic signature system using the private key corresponding to the public key loaded on the secure element. In particular, the electronic signature initially produced during the preliminary manufacture or configuration phase of the electronic device is loaded either into the data storage means or into the memory of the secure element.

According to one embodiment, an integrity control command is performed either when the device is started, or when its user requests its integrity be checked.

According to one embodiment, after at least one, but a determined number of executions of the integrity control steps do not result in confirmation of the integrity of the memory with respect to its initial state, a failure of the authentication check on the content of the memory leads to the use of one or more of the following degraded operating modes:

the user is notified of the failure of the integrity check,
access to the data loaded on the secure element is blocked,
access to the electronic device is blocked,
all or part of the data stored in the electronic device and the elements that comprise it are erased.

According to one embodiment, the secure element has in its memory a reference time interval T which is configured to be shorter than the maximum time required for the secure element to recover the entire content of the memory to be authenticated, and in which each integrity control command sent to the device causes the following successive steps to be executed:

the secure element sends, via the processor, a call to the data storage means for it to send one or more sequences of data extracted from its memory, the secure element identifies the time that elapses between sending the call and receiving, via the processor, the sequence or sequences requested, and compares it with the reference time interval T, if the elapsed time is greater than time T, the secure element refuses authentication of the memory content of the data storage means and interrupts execution of the following steps of the integrity control procedure.

According to one embodiment, when the time elapsed between the secure element sending the request and the sequence or sequences being received is less than the interval T, the secure element performs the integrity control steps while verifying the integrity of the sequences received with respect to the authenticity of the content of the memory which it must validate.

According to one embodiment, the function of the processor is handled by a microcontroller.

According to a second aspect, the invention relates to an electronic device, in particular a payment terminal, comprising at least:
- a processor,
- a secure element (which may particularly be a smart card) capable of storing and managing data, and onto which a public key intended for verifying an electronic signature has been loaded, and
- a means of storing data, the content of which has been previously authenticated and the integrity of which can be verified using the public key, capable of implementing and intended to implement an integrity control method as previously described, in which an integrity control command entails the execution of the following successive steps:
- the processor calls the secure element,
- in response, the secure element sends, via the processor, by means of data storage, a request to receive the entire content of its memory,
- the secure element then performs, through the processor and on the content received from the memory of the data storage means, an authentication check in order to verify, using the public key, that its content has not been modified since the initial authentication procedure,
- when the authentication check is successful, the device is considered to be integral.

More generally, the device implements the other steps and/or characteristics of the method described above.

According to one embodiment, the device comprises a microcontroller whose memory includes all or part of the data storage means and whose processor performs the function of the processor.

Depending on the case, the device also includes one and/or the other of the following additional means:
- a human/machine interface, in particular a keyboard or screen,
- an interface for communication with external digital devices, in particular
- a computer, a communication network or a remote server.

According to a third aspect, the invention relates to uses of such an electronic device implementing such an integrity control method.

BRIEF DESCRIPTION OF THE DRAWINGS

These uses are authentication, encryption and the secure remote exchange of data stored either inside the device itself or remotely and accessible through a communication network, or even the execution of transactions, particularly financial ones.

The figures of the drawings are now briefly described.

DETAILED DESCRIPTION OF THE PREFERRED EMBODIMENTS

The invention relates to a method for checking the integrity of an electronic device DE. As indicated, the electronic device DE will sometimes simply be referred to as the "device". It also relates to an electronic device DE capable of implementing and intended to implement said integrity control procedure.

It also relates to uses of the electronic device DE in that it implements the integrity control process.

A "Card payment system" refers to the functional combination of a payment terminal and a bank payment chip card.

However, this example and this App are not exclusive to others.

In a manner known per se, a device of this type of comprises at least:
- a processor MPU,
- a secure element SE, capable of storing and managing data and into which a public key KP has been loaded, intended for verifying an electronic signature, and
- a means of storing data, the content of which has been previously authenticated and the integrity of which can be verified using the public key KP. This data storage means MEM includes all or part of the internal memory of a microcontroller.

The device DE may also include a human/machine interface, in particular a keyboard or screen. It may also include a communication interface with external digital devices, in particular a computer, a communication network or a remote server.

The device DE may take the form of a flat and not very thick box, a few centimetres on each side, or else the form of a USB stick.

Such a device DE can, through the implementation of the integrity control method, be used for security functions, such as, in particular, the authentication, encryption and secure remote exchange of data stored either in the device DE itself, or remotely when accessible via a communication network. The device DE can therefore be implemented independently, or by communication with other electronic means. A typical use of the device DE is the execution of transactions, in particular financial transactions including for cryptocurrencies, in a secure manner.

In the context of the invention, an "integrity check" refers to a verification that the data have not been modified or destroyed in an unauthorised manner, in accordance with the definition given by ISO standard No. 7498-2. During a prior manufacturing or configuration phase FAB of the device DE, its constituent elements are authenticated by an ad hoc, governmental or private authority. In this way, the device DE is configured for the implementation of the method, thanks to this initial authentication procedure.

The integrity control process of the invention is implemented in a subsequent deployed phase USE.

We will now describe several possible embodiments of the invention.

Figure 1:
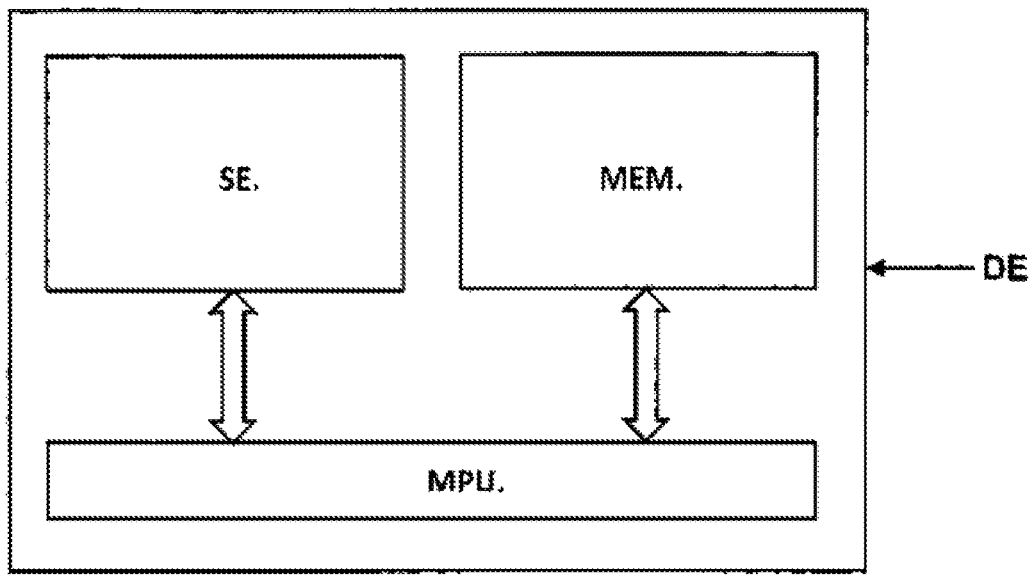
FIG. 1 is a diagram illustrating the electronic device according to the invention.
Figure 2:
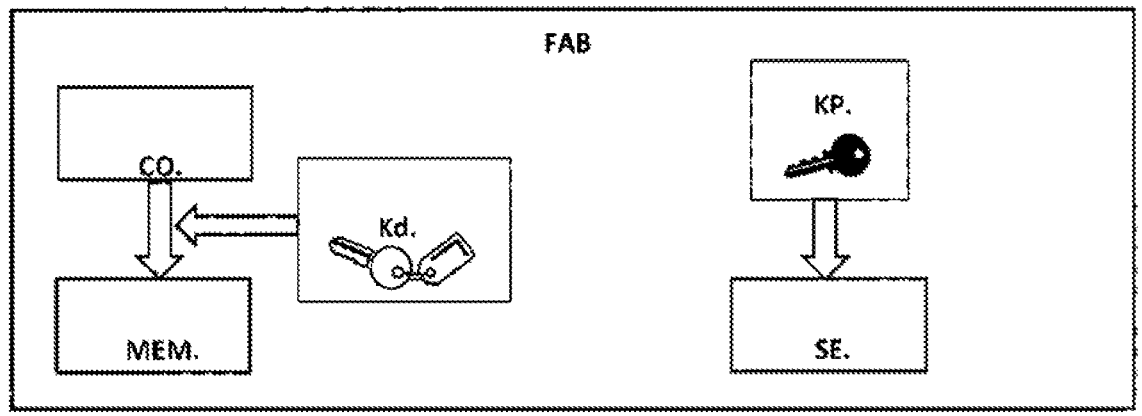
FIG. 2 is a diagram illustrating the preliminary phase of manufacturing or setting up the device in question.
Figure 3:
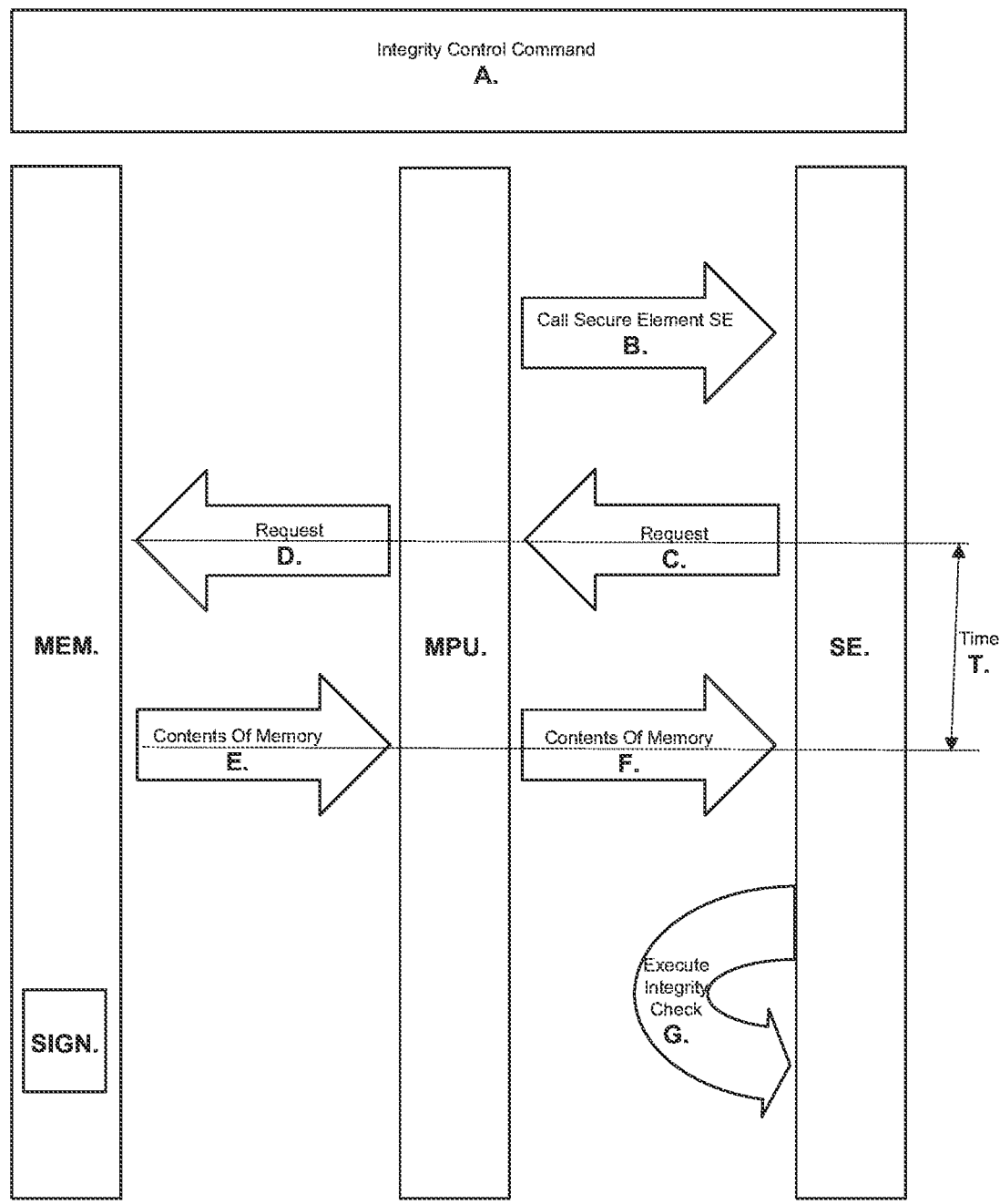
FIG. 3 is a sequence diagram illustrating the steps of the deployed phase of the integrity control process of the device in question.

A more detailed description will now be given of the prior manufacturing or configuration phase FAB of the device DE, with reference to FIG. 2. This phase occurs concurrently with the physical manufacturing of the device DE, or possibly afterwards, but before the subsequent deployed phase USE. The transition from the pre-production or FAB configuration phase to the deployed USE phase is irreversible. During said prior configuration phase of the electronic device, the initial content CO of the memory of the data storage means MEM is validated using digital authentication means such as, in particular, an electronic signature system using the private key Kd corresponding to the public key KP loaded in the secure element SE. Depending on the case, the electronic signature SIGN is loaded either in the data storage means MEM (as illustrated in FIG. 3), or in the memory of the secure element SE.

The method for checking the integrity of the electronic device DE during the subsequent deployed phase USE will now be described in more detail with reference to FIG. 3. This integrity control method is such that an integrity control command A leads to the execution of the successive steps and operations described below (each step is illustrated in FIG. 3 by an arrow, with a description identifying the step).

Firstly, the device's processor MPU calls the secure element SE (arrow B).

In response, the secure element SE sends, via the processor MPU (arrow C), by means of data storage MEM, a request (arrow D) to receive the entire content of its memory arrow E.

The invention has the advantage of providing full control without compromising the memories of the various microprocessors in the system.

The secure element must delegate display and user interaction operations to the processor MPU, and to do this it requires a validated code to be executing on the processor MPU. Consequently, the MPU processor must execute an integral code in order to avoid the user having a mismatch between the information displayed and the information actually manipulated by the secure element SE.

Due to the fact that the entire memory of the processor MPU collaborating with the secure element SE is controlled, complete security is provided, the processor MPU has no room for manoeuvre to operate non-integral procedures, and the level of functionality of the secure element SE is adapted.

The secure element SE can, for example, decide to use an overall security level as follows:
full: the memory of the processor MPU is recognised to be integral and the countermeasures designed to detect a false processor MPU return negative results.
partial (authentication function only): the memory of the processor MPU is recognised as integral, but certain countermeasures designed to detect a falsified processor MPU return positive results, the secure element SE will only accept requests for content authentication via the user secrets, but will reject all other requests.
null: the memory of the processor MPU is not recognised as being integral. In this case, the secure element SE will not accede to any request calling on the secrets of the user, but will nevertheless authorise the execution of other cryptographic operations (importing external secrets, manipulation of the same). In this case, and as an option, the secure element SE can decide to erase the user's secrets for added confidentiality.

From these security levels, it appears that the secure element SE is not only controlled by the system which submits requests to it, but can decide, on the basis of these, the responses to its own requests to the system and the level of functionality it will be able to deliver.

Then the secure element SE performs, on the content received (arrow F) from the memory of the data storage means MEM, an authentication check (arrow G) in order to verify by means of the public key KP that its content has not been modified since it was initially authenticated.

When the authentication check is successful, the device DE is considered to be integral.

Depending on the case and depending on the capacities of the constituent elements of the device DE, the steps and operations corresponding to arrows C, D, E and F relate either to the entire content of the memory of the data storage means MEM, or to parts of said content, in which case the steps and operations corresponding to arrows C, D, E and F are repeated until the entire content has been received by the secure element SE, such that it can then execute the integrity check (arrow G).

Depending on the case, an integrity control command A is executed either when the device DE is started, or when the user requests an integrity check.

When the device DE is considered to be integral, it is able to operate according to the nominal behaviour attributed to it.

When, on the other hand, the authentication check fails, the device DE is programmed to operate in a suitable mode taking into account the failure of the verification procedure. Suitable modes may, for example, include a user alert process requiring a positive action on the user's part to continue with the implementation of the device DE or, on the contrary, not to continue with it.

In one embodiment it is expected that, after at least one, or a determined number of executions of the integrity control steps, which have not resulted in confirming the integrity of the memory of the data storage means MEM with respect to its initial state, the failure of the authentication check on the content of the memory of the data storage means MEM will result in the use of one or more of the following degraded operating modes:
the user is notified of the failure of the integrity check,
access to the data loaded in the secure element SE is blocked,
access to the device DE is blocked,
all or part of the data stored in the device DE and the elements that comprise it are erased.

In one embodiment (see FIG. 3), provisions are made for the secure element SE to have available in memory a reference time interval T which is configured to be less than the maximum time necessary for the execution of a sequence of steps corresponding to arrows C, D, E and F, and in which each integrity control command sent to the device DE entails the execution of the following successive steps:
the secure element SE sends, via the processor MPU, a request to the data storage means MEM, such that it sends it one or more sequences of data extracted from its memory,
the secure element SE measures the time which elapses between sending the request and receipt, via the processor (MPU), of the sequence or sequences requested, and compares this with the reference time interval T,
If the elapsed time is greater than time T, the secure element refuses to authenticate the content of the memory of the data storage means and interrupts execution of the subsequent steps of the integrity control procedure.

When the time elapsed between the sending of the request by the secure element SE and the receipt of the requested sequence or sequences is less than interval T, the secure element SE executes the steps of the integrity control procedure, while verifying the integrity of the sequences received with respect to the authenticity of the memory content which it must validate.

The invention claimed is:

1. A method for checking an integrity of an electronic device, the electronic device comprising:
    a secure element, capable of storing and managing data and onto which a public key has been loaded, and intended for verifying an electronic signature, wherein the electronic signature was initially produced during a preliminary configuration phase of the electronic device,
    a processor configured to collaborate with the secure element, and
    a means of storing data, comprising a memory whose entire content has been initially authenticated and whose integrity can be verified using the public key, the memory comprising a code executable by the processor,
wherein:
    in response to a request from the processor when the device is started, the secure element performs, on the entire content of the memory of the data storage means received through the processor, an authentication check of the entire content of the memory, in order to check, using the public key, that the entire content has not been modified since the initial authentication, the device being considered to be integral by the secure element when the authentication check has been successful,
the secure element stores a reference time interval T which is configured to be less than a maximum time required for the secure element to recover, through the processor, the entire content of the memory to be authenticated,
the authentication check of the entire content of the memory includes the following successive steps performed by the secure element and repeated until the entire content of the memory has been received:
    sending to the data storage means, through the processor, a request to send one or more sequences of data extracted from the memory,
    measuring a time which elapses between sending the request and receipt of the sequence or sequences requested, and comparing the time with the reference time interval T, and
    if the elapsed time is greater than the reference time interval T, refusing to authenticate the entire content of the memory of the data storage means and interrupting execution of the subsequent steps of the authentication check.

2. The method of claim 1, in which, when the device is considered to be integral, the secure element device is able to operate according to a nominal behaviour which has been attributed to it.

3. The method of claim 1, in which when the authentication check fails, the secure element is programmed to operate in a suitable mode taking into account a failure of the authentication check.

4. The method of claim 1, wherein during the preliminary configuration phase for configuration of the electronic device, the initially authenticated entire content of the memory of the data storage means is validated using the electronic signature system using a private key corresponding to the public key loaded on the secure element.

5. The method of claim 4, in which the electronic signature initially produced during the preliminary configuration phase of the electronic device is loaded either into the data storage means, or into the memory of the secure element.

6. The method of claim 1, in which the authentication check is performed either when the device is started or when the device receives a request from a user for an integrity check.

7. The method of claim 1 wherein, a failure of the authentication check on the entire content of the memory leads to the use of one or more of the following degraded operating modes:
    a user is notified of the failure of the integrity check,
    access to the data loaded on the secure element is blocked,
    access to the electronic device is blocked,
    all or part of the data stored in the electronic device is erased.

8. The method of claim 1, in which, when the time elapsed between the sending by the secure element of a request to send one or more sequences of data extracted from the memory and the receipt of the requested sequence or sequences is less than the time interval T, the secure element verifies the integrity of the sequence or sequences received with respect to the authenticity of the entire content of the memory which it must validate.

9. The method of claim 1, wherein the processor is a microcontroller and the memory of the data storage means is a memory of the microcontroller.

10. An electronic device comprising:
    a secure element capable of storing and managing data and into which has been loaded a public key intended to verify an electronic signature, wherein the electronic signature was initially produced during a preliminary configuration phase of the electronic device,
    a processor configured to collaborate with the secure element, and
    a means of data storage comprising a memory whose entire content has been initially authenticated and whose integrity can be verified using the public key, the memory comprising a code executable by the processor,
    wherein:
        the secure element is configured to perform, in response to a request from the processor when the device is started, on the entire content of the memory of the data storage means received through the processor, an authentication check of the entire content of the memory, in order to check, using the public key, that the entire its content has not been modified since the initial authentication, the device being considered to be integral by the secure element when the authentication check has been successful,
        the secure element is configured to store a reference time interval T which is configured to be less than a maximum time required for the secure element to recover, through the processor, the entire content of the memory to be authenticated,
        the secure element is configured to perform and repeat the following successive steps, until the entire content of the memory has been received:
            sending to the data storage means, through the processor, a request to send it one or more sequences of data extracted from the memory, measuring a time which elapses between sending the request and receipt of the sequence or sequences requested, and compares the time with the reference time interval T, and if the elapsed time is greater than the reference time interval T, refusing to authenticate the entire content of the memory of the data storage means and interrupting execution of the subsequent steps of the authentication check.

11. The electronic device of claim 10, in which the processor is a microcontroller and the memory of the data storage means is the memory of the microcontroller.

12. The electronic device of claim 10, including one or more of the following complementary means:

a human/machine interface, in particular a keyboard or screen, a communication interface with external digital devices, in particular a computer, a communication network or a remote server.

13. The method of claim 1, wherein the electronic device takes the form of a flat box and is configured for an execution of financial transactions involving cryptocurrencies.

\* \* \* \* \*